United States Patent [19]

Olson et al.

[11] 3,777,083
[45] Dec. 4, 1973

[54] PRESSURIZED GAS INSULATED SWITCHING INSTALLATION

[75] Inventors: Willi Olson; Klaus Schlosser, both of Berlin, Germany

[73] Assignee: Siemens Aktiengesellschaft, Munich, Germany

[22] Filed: Aug. 10, 1972

[21] Appl. No.: 279,394

[30]     Foreign Application Priority Data
    Sept. 29, 1971   Germany................... P 21 49 287.5

[52] U.S. Cl. ........................... 200/48 R, 200/148 R
[51] Int. Cl. .......................................... H01h 31/00
[58] Field of Search.................... 200/148 R, 48 RP, 200/48 R, 48 CB, 48 SB

[56]            References Cited
            UNITED STATES PATENTS
3,248,611   4/1966   Wilcox.............................. 200/48 R Primary Examiner—Herman J. Hohauser
Attorney—Hugh A. Chapin

[57]            ABSTRACT

In a pressurized gas insulated switching installation having two branches that can be coupled, through power switches, with a type of bus-bar two-part ring-bar, the two parts of the ring-bar are connected with three power switches connected in series, and between the power switches the connection points for the branches are situated. The poles of the three power switches belonging to one phase are disposed in one common vertical plane and two horizontal planes.

6 Claims, 2 Drawing Figures

023
PRESSURIZED GAS INSULATED SWITCHING INSTALLATION

BACKGROUND OF THE INVENTION

1. Field of the Invention

The invention relates in general to electrical switching installations and more particularly to a pressurized gas insulated switching installation.

2. Description of the Prior Art

In British Pat. No. 505,638 a metal-encapsulated switching installation, filled with an insulating medium, is shown. In this case gas under pressure may also be regarded as an insulating medium. This switching installation comprises one two-part ring-bar, to which a number of individual or common branches can be coupled. Each branch is thereby switched through the intermediary of a power switch associated with it. In the event that a power switch fails, current stops in its associated branch, and it cannot be aided by supplying energy from another branch.

On the other hand, in a switching installation having two power switches per branch reliability is increased. In the event of failure of one power switch, the associated branch can be connected to the bus bar through the intermediary of the second power switch, and thus be supplied with energy.

SUMMARY OF THE INVENTION

The invention is concerned with a switching installation, insulated by pressurized gas and having two branches that can be coupled, through the intermediary of power switches, with a type of bus-bar two-part ring-bar. Here the ring-bar is part of a current-supplying network. In this application, while increased reliability is obtained, there is a problem of keeping the cost of operating means small. In addition, an appropriate compact construction for the switching installation should be obtained. In accordance with the invention, the two parts of the ring-bar are connected with three power switches electrically connected in series. Between the switches the connection points of the branches are located. Furthermore the poles of the three power switches belonging to one phase are disposed in one common vertical plane and in two horizontal planes.

By means of the invention the operational reliability of the installation is increased, since in the event of failure of one power switch, the branch becoming currentless can, through the intermediary of a second power switch, be supplied with energy. The expense hereby is advantageously smaller than in the case of collector-bar systems having two power switches per branch, because with the installation of the invention only 1.5 power switches per branch are used.

Moreover optimum bulk is obtained through the arrangement of the three power-switch poles in one common vertical plane and two superposed horizontal planes. It is possible to build up narrow sections, whose lengths are determined chiefly by two power switches and the associated aggregate, e.g., disconnecting switches, grounding switches, voltage and current transformers and the like. A particularly favorable arrangement results when two power switches are disposed in the upper horizontal plane and one power switch is disposed in the lower horizontal plane. Here the poles of the power switches in the upper horizontal plane are advantageously disposed so that they can be removed in an upward direction for replacement, while the pole of the power switch disposed in the lower plane can be removed in a downward direction for replacement. The design height of a section above the ground can be decreased if the power switch situated in the lower horizontal plane is disposed in a special recess on the ground side.

One advantageous utilization of space in the case of a plurality of sections can be obtained when the two parts of the ring-bar are disposed spatially between the two connections of the individual power switches situated in one horizontal plane.

BRIEF DESCRIPTION OF THE DRAWINGS

One example of the construction embodying the invention, in the switching installation insulated by pressurized gas, is described by reference to the drawings in which.

DESCRIPTION OF THE PREFERRED EMBODIMENT

Figure 1:
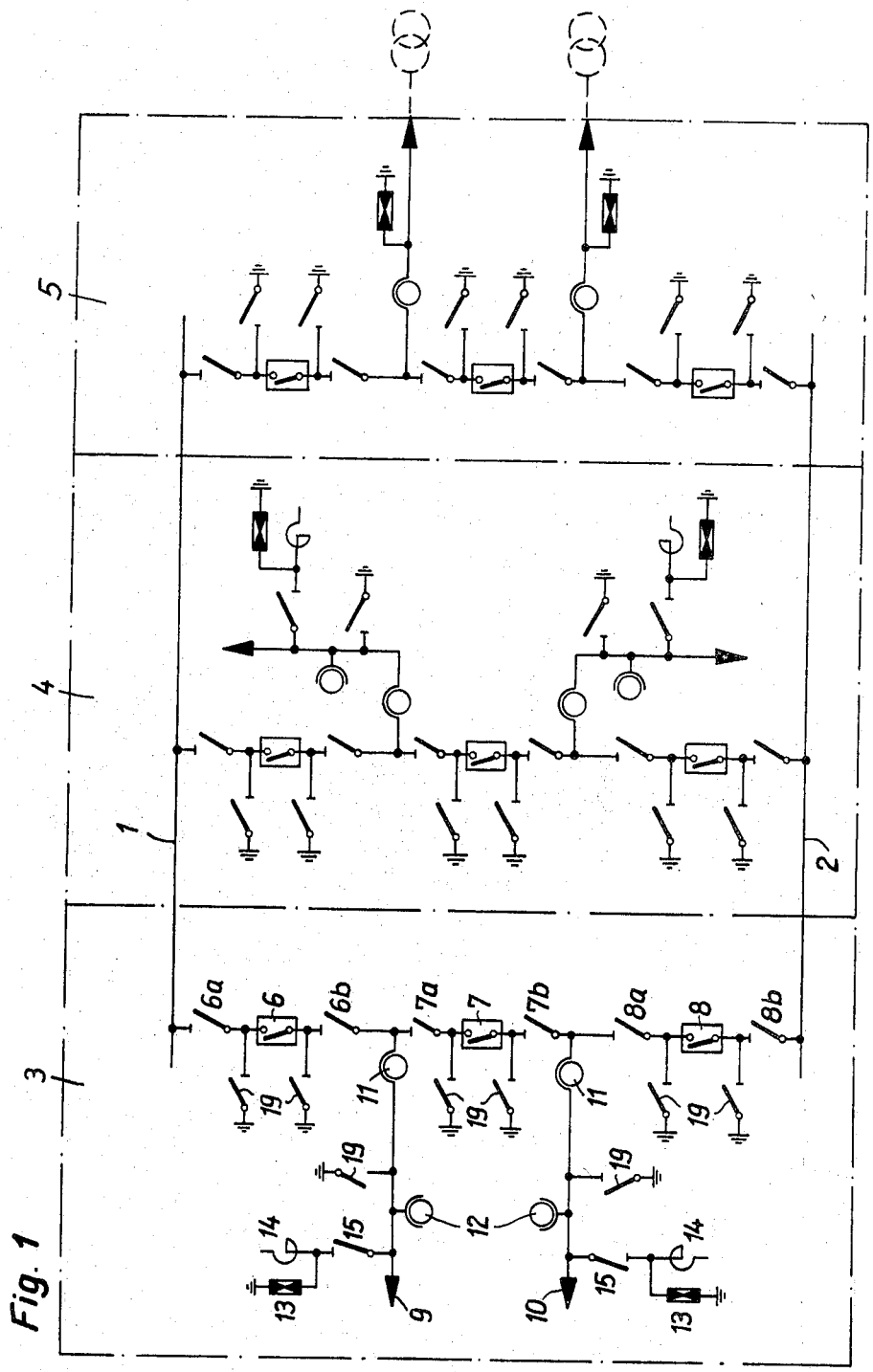
FIG. 1 shows a circuit diagram for a gas-insulated switching installation.

The circuit diagram of FIG. 1 shows two portions 1 and 2 of a type of bus-bar ring-bar, connected to a current-supplying network and having the three sections 3, 4 and 5 in common. In section 3 the two portions 1, and 2 of the ring-bar are electrically connected together through the intermediary of three power switches 6, 7 and 8, whereby each of the power switches 6 to 8 is associated with two disconnecting switches 6a, 6b; 7a, 7b; and 8a, 8b. Each section of the pressurized gas insulated switching installation, in accordance with the invention, is comprised of two branches 9, 10, which are connected between the power switches 6, 7, and 7, 8 respectively. Along each branch 9 or 10 current transformers 11, voltage transformers 12, overvoltage limiters 13 and chokes 14 are provided. The overvoltage limiter 13 and the choke 14 can be switched out through disconnect switches 15. Furthermore, each of the power switches 6 to 8, and each of the branches 9 and 10, is equipped with grounding switches 19, for the purpose of insuring safe operation of the electrical parts of the gas-insulated switching installation.

Figure 2:
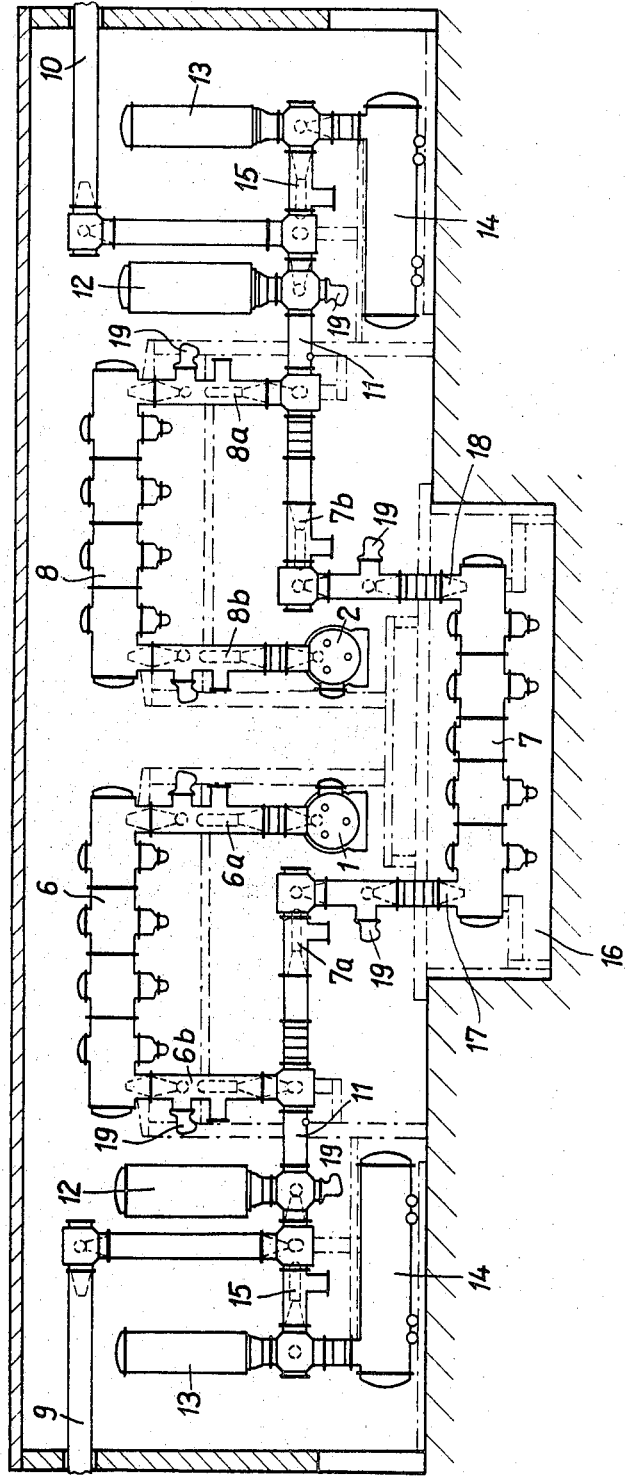
FIG. 2 illustrates the gas-insulated switching installation with one section.

The switching installation schmatically shown in FIG. 2, insulated by pressurized gas, has parts similar to those of FIG. 1 and they are indicated by same reference numerals. This installation comprises the poles of the power switches 6, 7 and 8, belonging to one phase of the 3-phase system, in one common vertical plane, corresponding to the plane of the sheet of the drawing. As can be seen, the power switches 6, 8, are disposed in an upper horizontal plane, and the power switch 7 is disposed in a lower horizontal plane. The poles of the power switches are here made with a definitely elongated longitudinal axis or stem and are horizontally disposed. These lengthwise stems belong both in the vertical and the horizontal planes. The power switches 6, 8, can be upwardly removed for inspection or replacement work; while the power switch 7 is arranged to be downwardly removed. In accordance with the invention in order to limit the height of the switching installation above the ground, the power switch 7 is set in a recess 16 on the ground side. The two parts 1, 2 of the type of bus-bar ring-bar are spatially located between the two connections 17, 18, or the power switch 7 situated in the lower horizontal plane.

The switching installation of the invention, insulated by a pressurized gas, such as $SF_6$, is characterized by narrow sections of small length, so that a smaller area is needed in comparison to conventional switching installations. Through the arrangement of 1.5 power switches per branch approximately the same operational reliability is obtained as with collector-bar systems having two power switches per branch, whereby the cost of the operating means is decreased.

In the foregoing, the invention has been described in reference to specific exemplary embodiments. It will be evident, however, that variations and modifications, as well as the subsitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. A pressurized gas insulated switching installation, adapted for coupling, through the intermediary of power switches, to a type of bus-bar two-part ring-bar, comprising three electrical power switches serially connected between the two parts of the ring-bar, two electrical branch circuits connected at connection points located between the switches such that the poles of the three power switches are disposed in a common vertical plane and in two horizontal planes.

2. A pressurized gas insulated switching installation, in accordance with claim 1, in which two power switches are disposed in an upper horizontal plane, and one power switch is disposed in a lower horizontal plane.

3. A pressurized gas insulated switching installation, in accordance with claim 2, in which the poles of the power switches, disposed in the upper horizontal plane, can be upwardly removed.

4. A pressurized gas insulated switching installation, in accordance with claim 2, in which the pole of the power switch disposed in the lower plane can be downwardly removed.

5. A pressurized gas insulated switching installation, in accordance with claim 4, in which the power switch located in the lower horizontal plane is disposed in a recess at the ground side.

6. A pressurized gas insulated switching installation, in accordance with claim 5, in which the two portions of the ring-bar are spatially located between the two connections of the power switches individually located in one horizontal plane.

* * * * *